United States Patent
Tang et al.

(10) Patent No.: US 11,928,528 B2
(45) Date of Patent: Mar. 12, 2024

(54) CONTAINER IN CONTAINER METHOD TO CONFINE PRIVILEGED MODE EXECUTION DURING HOST DATA EXCHANGE IN A CONTAINERIZED ENVIRONMENT

(71) Applicant: Dell Products L.P., Round Rock, TX (US)

(72) Inventors: HongYao Tang, Shanghai (CN); Dong Zhang, Shanghai (CN); XiaoJun Wu, Shanghai (CN); Muzhar S. Khokar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/573,737

(22) Filed: Jan. 12, 2022

(65) Prior Publication Data

US 2023/0222016 A1     Jul. 13, 2023

(51) Int. Cl.
*G06F 15/04* (2006.01)
*G06F 9/445* (2018.01)
*G06F 9/54* (2006.01)

(52) U.S. Cl.
CPC .......... *G06F 9/544* (2013.01); *G06F 9/44505* (2013.01)

(58) Field of Classification Search
CPC .............................. G06F 9/544; G06F 9/44505
See application file for complete search history.

(56) References Cited

U.S. PATENT DOCUMENTS

| | | | | |
|---|---|---|---|---|
| 2017/0286153 A1* | 10/2017 | Bak | ......................... | G06F 9/542 |
| 2019/0273744 A1* | 9/2019 | Goel | ....................... | G06F 9/468 |
| 2020/0012511 A1* | 1/2020 | Ganesh | ............... | G06F 9/44526 |
| 2022/0188192 A1* | 6/2022 | Wang | .................. | G06F 11/1438 |
| 2022/0188444 A1* | 6/2022 | Stoler | ..................... | H04L 9/006 |
| 2023/0087066 A1* | 3/2023 | Lueders | .............. | G06F 16/2365 |
| | | | | 707/690 |

OTHER PUBLICATIONS

Vivek Vijay Sarkale et al. "Secure Cloud Container: Runtime Behavior Monitoring using Most Privileged Container (MPC)". (Year: 2017).*

* cited by examiner

*Primary Examiner* — Andy Ho
*Assistant Examiner* — Abdou K Seye
(74) *Attorney, Agent, or Firm* — Jackson Walker L.L.P.

(57) ABSTRACT

A disclosed method for implementing containers in an information handling system generates, with a first non-privileged container, a request that is sent to a RESTful API. Whenever the API identifies a request requiring host access the API launches a second container, which is configured to operate in a privileged execution mode. The second container accesses the host and executes the requested actions. When the request completes, the first container resumes non-privileged execution, thereby confining privileged mode execution to a container that is only active during host interaction. The host access can be access required to: exchange data with the host, query the host for hardware information, and modify host configuration. The host may be implanted within a device featuring an HCI infrastructure. In one configuration, the host resides of one of multiple distinct nodes of an HCI appliance.

12 Claims, 2 Drawing Sheets

CONTAINER IN CONTAINER METHOD TO CONFINE PRIVILEGED MODE EXECUTION DURING HOST DATA EXCHANGE IN A CONTAINERIZED ENVIRONMENT

TECHNICAL FIELD

The present disclosure relates to information handling systems and, more particularly.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The first two decades of the 21$^{st}$ century witnessed the birth and development of commercially viable cloud computing platforms and the emergence of virtualized and microservice-based frameworks for implementing critical business applications. In an effort keep pace with demand for cloud-based information handling resources, converged infrastructure and, more recently, hyper-converged infrastructure (HCI) architectures and systems have emerged as cost saving techniques for centralizing and simplifying management of information technology (IT) resources and improving resource utilization. Those of ordinary skill in these fields will appreciate that, because microservices are generally autonomous, a great deal of inter-service messaging is a challenging reality for microservice-based solutions. When containerized microservices are implemented on converged and hyper-converged systems, messaging can be particularly difficult from a security perspective as the nexus between host resources and virtual applications becomes increasingly blurred. A containerized microservice operating within the confines of the container platform is generally and desirably prevented from accessing host resources, but may still need to query the host for hardware information and/or modify certain host configuration parameters.

SUMMARY

In accordance with teachings disclosed herein, common problems associated with privileged containers are addressed by a disclosed method for implementing containers in an information handling system. The disclosed method generates, with a first non-privileged container, a request that is sent to a RESTful API. Whenever the API identifies a request requiring host access the API launches a second container, which is configured to operate in a privileged execution mode. The second container accesses the host and executes the requested actions. When the request completes, the first container resumes non-privileged execution, thereby confining privileged mode execution to a container that is only active during host interaction. The host access can be access required to: exchange data with the host, query the host for hardware information, and modify host configuration. The host may be implanted within a device featuring an HCI infrastructure. In one configuration, the host resides of one of multiple distinct nodes of an HCI appliance.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
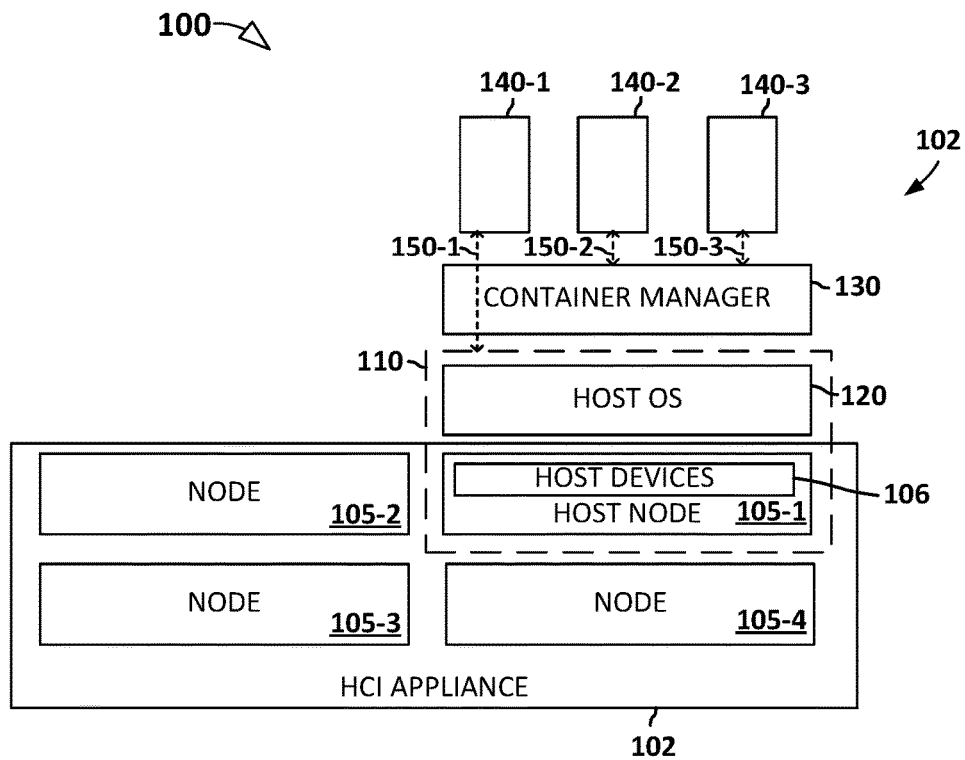
FIG. 1 illustrates an information handling system including a host supporting a container platform.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system 100 configured to create and support a container platform 101. The illustrated information handling system 100 implements container platform 101 within a hyper-converged infrastructure (HCI) appliance 102 featuring four nodes 105 housed in a common chassis and including a host node 105-1 that supports the illustrated container platform 101. HCI appliance 102, as suggested by its name, incorporates an HCI architecture with—supported and tightly-integrated virtualized compute, storage, and network resources. In at least some embodiments, each node 105 of HCI appliance 102 is a distinct physical resource that also incorporates an HCI architecture. Commercially distributed examples of an appliance suitable for use as the HCI appliance 102 of FIG. 1 include any of the G Series models of Dell EMC VxRail appliances from Dell Technologies. Although FIG. 1 illustrates container platform 102 implemented within an HCI appliance, container platform 101 may, in other embodiments, be included in any suitable virtual-capable server-class information handling system.

The container platform 102 of FIG. 1 includes a host system or, more simply, a host 110 encompassing physical resources collectively referred to herein as host devices 106 and a host operating system (OS) 120. Host resources 106 may include one or more central processing units (CPUs), memory and storage devices, and networking devices. For the sake of clarity, the individual components comprising host resources 106 have been omitted from FIG. 1. Host OS 120 may be a Linux or Linux derivate OS, a Microsoft Windows family OS, or another suitable general purpose operating system.

A container manager 130 executing within host OS 120 is depicted supporting three containers 140 including first, second, and third containers 140-1, 140-2, and 140-3 respectively. Container manager 130 may be implemented with any of various container orchestration software packages including, without limitation, Docker Swarm, Kubernetes or a suitable alternative. Although FIG. 1 illustrates container manager 130 supporting three containers 140, it will be readily appreciated that container manager 130 may support more of fewer containers.

In at least one increasingly pervasive configuration, each container 140 may correspond to a microservice wherein the combined functionality of the various containers 140 support an application goal or function. To illustrate with a frequently cited example, an ecommerce website might include one or more distinct function-specific microservices including, without limitation, microservices for: a front end or storefront, an identity/account function, a catalog function, an inventory function, a shopping basket function, a shipping function, and so forth.

FIG. 1 further illustrates a privileged execution status of each container 140. More specifically, FIG. 1 illustrates first container 140-1 as a privileged container, i.e., a container configured to execute in a privileged mode, represented by the arrow icon 150-1, which indicates an ability of first container 140-1 to access host devices and to set at least some host configuration parameters. In at least some embodiments, a privileged container has substantially the same access to host 102 as a host process executing outside of any containers. Unlike first container 140-1, second and third containers 140-2 and 140-3 are both illustrated operating with a non-privileged execution status, represented by the arrow icons 150-2 and 150-3 extending between each container (140-2 and 140-3) and container manager 130. The non-privileged status icons 150-2 and 150-3 indicate that the applicable container's access does not extend to the host, i.e., the container cannot access host devices or configuration parameters.

Those of ordinary skill in the field of HCI architecture will appreciate that, within an HCI environment, microservices may be required to communicate with the host to access host hardware information, modify host configuration, or take some other action. Privileged containers, such as first container 140-1, may be used to enable host interactions, but privileged containers raise security concerns by exposing root-like host access that could potentially permit an unauthorized process to perform actions that negatively and/or permanently impact the host. Moreover, it will appreciated by those of ordinary skill in the field of containerized platforms that the microservice appliances 140 illustrated in FIG. 1 may, in many instances, persist for an appreciable duration e.g., hours or days, thereby increasing the associated risk.

Figure 2:
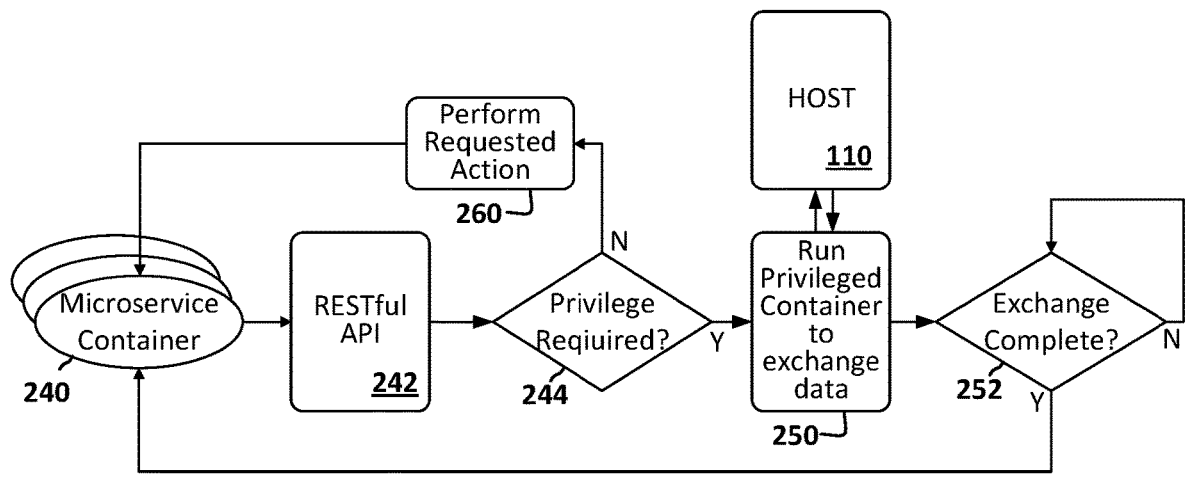
FIG. 2 illustrates components of a disclosed configuration for confining privileged execution of one or more containers.

To address the risk associated with privileged containers, a containerized environment 200, illustrated in FIG. 2, in accordance with disclosed teachings for confining privileged execution, implements a steady-state non-privileged container 240 configured to invoke a privileged container 250 "on-demand", i.e., only for so long as privileged execution is necessary to complete a task such as exchanging data with host 110. When the privileged container completes the task, non-privileged status is restored as the non-privileged container resumes execution, thereby limiting privileged execution and the root access exposure associated with privileged execution to the comparatively brief intervals during which host data exchanges and other privileged communications are in flight.

As depicted in FIG. 2, one or more microservice containers 240 are configured as non-privileged containers. i.e., containers that cannot access host devices or exchange data with host 110. Each of the illustrated containers 240 is, however, configured to access and invoke an application programming interface (API) 242 that is RESTful, i.e., compliant with a representational state transfer (REST) model for defining the behavior of distributed system components, such as the client and server components of a Web-based service or function.

The microservice container 240 illustrated in FIG. 2 may issue a restful request, e.g., an HTTP GET request, to restful API 242. Upon receiving the request, restful API 242 may determine (operation 244) whether the request requires an exchange of data with host 110, a change in the configuration of host 110, or any other action required privileged execution. If the request does not require privileged execution or privileged access, The requested action may be performed (operation 260) without substantial delay, before execution returns to microservice 240. If, on the other hand, restful API 242 determines that the request from microservice container 240 requires privileged mode execution, restful API 242 may launch, invoke, or otherwise run a privileged container 250 to initiate and complete the requested data exchange with host 110. When the privileged exchange between privileged container 250 and host 110 completes, as determined in block 252, the privilege container 250 is halted and execution returns to microservice container 240 in non-privileged execution mode. By confining secure privileged execution to an Embedded container that is only active while the privileged access required is necessary, the implemented platform beneficiary reduces the risk of tampering from unauthorized processes.

Figure 3:
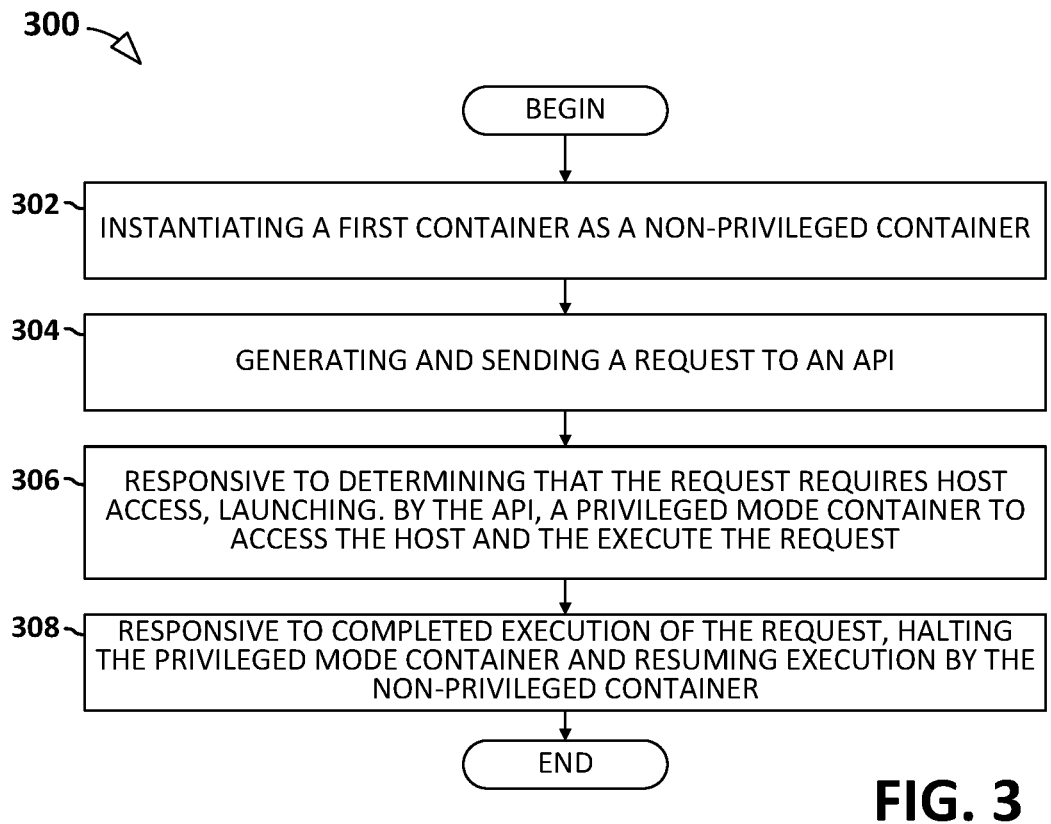
FIG. 3 illustrates a block diagram of a method in accordance with disclosed teachings.

Turning now to FIG. 3, a method 300, in accordance with disclosed teachings for confining privileged containers and root access, is illustrated in flow diagram format. The illustrated method 300 begins with the instantiating (operation 302) of a first container as a non-privileged container. In operation 304, a request is generated by the non-privileged container and sent to an API. In operation 306, the API, responsive to determining that the request requires host access, launches a privileged mode container to access the host and execute the request. When the execution of the request is completed (operation 308), the privileged container is halted and execution of or by the non-privileged container resumes. Method 300, as discussed previously, beneficially confines privileged mode execution to intervals during which privileged mode access is actively required such as when a host data exchange is "in-flight." Once the privileged exchange completes, the platform resumes un-privileged execution.

Figure 4:
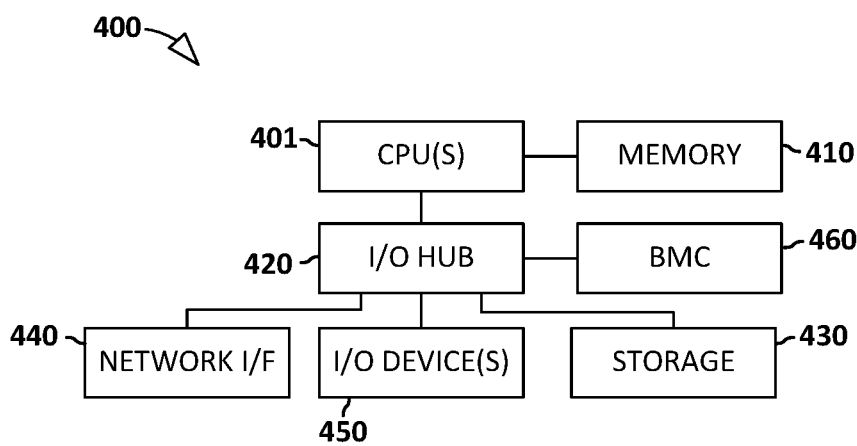
FIG. 4 illustrates an exemplary information handling system.

Referring now to FIG. 4, any one or more of the components illustrated in FIG. 1 and FIG. 2 may implanted as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A container implementation method, comprising:
sending, by a first container, an application program interface (API) call associated with a request to an API configured to identify requests requiring host access;
responsive to determining that the request requires host access, invoking a second container;
accessing, with the second container, the host to execute the request; and
responsive to detecting completion of the API call, halting the second container and resuming execution with the first container, wherein the first container is configured to execute in non-privileged model, the second container is configured to execute in privileged mode, and the request comprises a request selected from:
exchanging data with the host; and
querying the host for hardware information.

2. The method of claim 1, wherein the API comprises a restful API.

3. The method of claim 1, wherein the host is implemented in a hyper-converged (HCI) infrastructure appliance.

4. The method of claim 3, wherein the host comprises one of a plurality of nodes of the HCI appliance.

5. An information handling system, comprising:
a central processing unit (CPU); and
a non-transitory memory, accessible to the CPU, including processor executable instructions that, when executed by the processor, cause the system to perform container implementation operations, comprising:
sending, by a first container, an application program interface (API) call associated with a request to an API configured to identify requests requiring host access;
responsive to determining that the request requires host access, invoking a second container;
accessing, with the second container, the host to execute the request; and
responsive to detecting completion of the API call, halting the second container and resuming execution with the first container, wherein the first container is configured to execute in non-privileged model, the second container is configured to execute in privileged mode, and the request comprises a request selected from:
exchanging data with the host; and
querying the host for hardware information.

6. The information handling system of claim 5, wherein the API comprises a restful API.

7. The information handling system of claim 5, wherein the host is implemented in a hyper-converged (HCI) infrastructure appliance.

8. The information handling system of claim 7, wherein the host comprises one of a plurality of nodes of the HCI appliance.

9. A non-transitory computer readable medium comprising processor executable instructions that, when executed by a processor, cause the processor to perform container implementation operations comprising:
sending, by a first container, an application program interface (API) call associated with a request to an API configured to identify requests requiring host access;
responsive to determining that the request requires host access, invoking a second container;
accessing, with the second container, the host to execute the request; and
responsive to detecting completion of the API call, halting the second container and resuming execution with the first container, wherein the first container is configured to execute in non-privileged model, the second container is configured to execute in privileged mode, and the request comprises a request selected from:
exchanging data with the host; and
querying the host for hardware information.

10. The non-transitory computer readable medium of claim 9, wherein the API comprises a restful API.

11. The non-transitory computer readable medium of claim 9, wherein the host is implemented in a hyper-converged (HCI) infrastructure.

12. The non-transitory computer readable medium of claim 11, wherein the host comprises one of a plurality of nodes of the HCI appliance.

* * * * *

UNITED STATES PATENT AND TRADEMARK OFFICE
CERTIFICATE OF CORRECTION

| | |
|---|---|
| PATENT NO. | : 11,928,528 B2 |
| APPLICATION NO. | : 17/573737 |
| DATED | : March 12, 2024 |
| INVENTOR(S) | : Tang et al. |

It is certified that error appears in the above-identified patent and that said Letters Patent is hereby corrected as shown below:

In the Claims

Column 7, Line 1 should read:
1. A container implementation method, comprising:
    sending, by a first container, an application program interface (API) call associated with a request to an API configured to identify requests requiring host access;
    responsive to determining that the request requires host access, invoking a second container;
    accessing, with the second container, the host to execute the request; and
    responsive to detecting completion of the API call, halting the second container and resuming execution with the first container, wherein the first container is configured to execute in non-privileged mode, the second container is configured to execute in privileged mode, and the request comprises a request selected from:
    exchanging data with the host; and
    querying the host for hardware information.

Column 7, Line 24 should read:
5. An information handling system, comprising:
    a central processing unit (CPU); and
    a non-transitory memory, accessible to the CPU, including processor executable instructions that, when executed by the processor, cause the system to perform container implementation operations, comprising:
        sending, by a first container, an application program interface (API) call associated with a request to an API configured to identify requests requiring host access;
        responsive to determining that the request requires host access, invoking a second container;
        accessing, with the second container, the host to execute the request; and
        responsive to detecting completion of the API call, halting the second container and resuming execution with the first container, wherein the first container is configured to execute in non-privileged mode, the second container is configured to execute in privileged mode, and the request comprises a request selected from:

Signed and Sealed this
Twenty-third Day of April, 2024

Katherine Kelly Vidal
*Director of the United States Patent and Trademark Office*

CERTIFICATE OF CORRECTION (continued)
U.S. Pat. No. 11,928,528 B2 exchanging data with the host; and
      querying the host for hardware information.

Column 8, Line 14 should read:
9. A non-transitory computer readable medium comprising processor executable instructions that, when executed by a processor, cause the processor to perform container implementation operations comprising:
      sending, by a first container, an application program interface (API) call associated with a request to an API configured to identify requests requiring host access;
      responsive to determining that the request requires host access, invoking a second container;
      accessing, with the second container, the host to execute the request; and
      responsive to detecting completion of the API call, halting the second container and resuming execution with the first container, wherein the first container is configured to execute in non-privileged mode, the second container is configured to execute in privileged mode, and the request comprises a request selected from:
      exchanging data with the host; and
      querying the host for hardware information.